Aug. 15, 1967  C. E. DALE  3,336,050
TRAILER HITCH APPARATUS
Filed Aug. 9, 1965  3 Sheets-Sheet 1

INVENTOR.
CHARLEY E. DALE
BY
*Ford E. Druitt*
ATTORNEY

Aug. 15, 1967  C. E. DALE  3,336,050
TRAILER HITCH APPARATUS
Filed Aug. 9, 1965  3 Sheets-Sheet 2
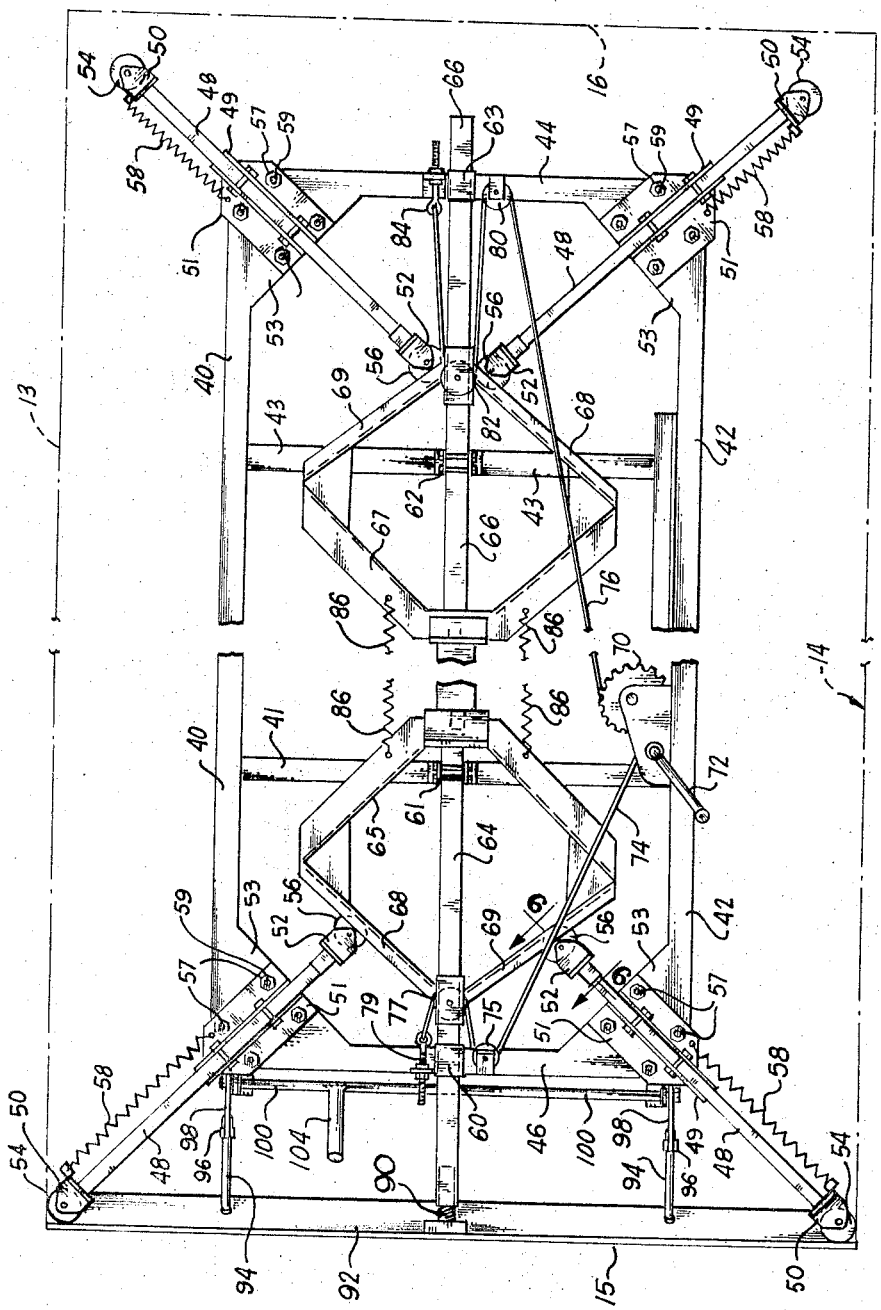
Fig. 4.  Fig. 5.
INVENTOR.
CHARLEY E. DALE
BY 
ATTORNEY Aug. 15, 1967 C. E. DALE 3,336,050
TRAILER HITCH APPARATUS
Filed Aug. 2, 1965 3 Sheets-Sheet 2

INVENTOR.
CHARLEY E. DALE
BY
ATTORNEY 3,336,050
TRAILER HITCH APPARATUS
Charley E. Dale, Seattle, Wash., assignor to The Dale-Jones Corporation, Los Altos, Calif., a corporation of California
Filed Aug. 9, 1965, Ser. No. 478,284
7 Claims. (Cl. 280—423)

This invention relates to a trailer hitch apparatus for coupling a trailer tow-bar to a tractor vehicle, and, more particularly, to a hitch apparatus adapted to be placed into a load-carrying box of a tractor vehicle and mechanically expanded into engagement with the box walls to obtain securement to the tractor vehicle.

An important object of this invention has been the provision of apparatus adapted to be disposed in and secured between the walls of a load-receiving box of a tractor vehicle which apparatus is simple to construct and easy to operate for a trailer through its tow-bar.

Another object of the invention has been the provision of a trailer hitch apparatus which provides a center of attachment that is located at a position closely over the rear axle of the tractor vehicle.

Still another important object of the invention is to provide a coupling for hauling a trailer by means of a powered vehicle which coupling apparatus is so designed that it obviates the necessity of the permanent connection between the hitch apparatus and the tractor vehicle.

A still further object of the invention resides in the provision of a semi-trailer having a forward-extending draw-bar and a swivel unit so constructed as to locate said unit within the conventional load-receiving portion of the truck in the vicinity above the truck's rear axle.

These and other objects of the invention will become more apparent during the course of the following description in which is set forth the preferred form of construction adopted for this improved trailer hitch apparatus.

In the accompanying drawings:

FIGURE 4 is an enlarged plan view of the forward half of the trailer hitch apparatus in extended or expanded condition;

FIGURE 5 is an enlarged planned view of the rear half of the trailer apparatus but in retracted position;

Figure 1:
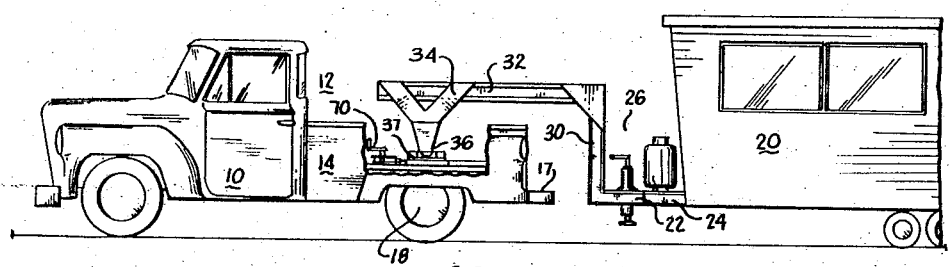
FIGURE 1 is a side elevation view of a tractor vehicle and a trailer and its tow-bar in assembled relation, portions being broken away for convenience of illustration.

The tractor vehicle 10 shown in FIGURES 1 and 2 has a load-receiving box 12 at the rear provided with the usual side walls 13 and 14, front wall 15 and the rear wall or tail gate wall 16, behind and below which may be a conventional ledge-type bumper 17. Such a tractor vehicle is often referred to as a "pick-up truck." It usually has a front engine with rear drive wheels 18 provided with the customary transverse axle lying generally under the middle of the load-bearing box 12.

The semi-trailer has a forward-extending draw-bar 22 connected into the trailer frame by yoke members 24. A screw jack 26 serves to support the draw-bar 22 when the front of the trailer is otherwise unsupported as by a tractor vehicle. Usually the jack 26 is a rotary screw having a crank at its upper end and a foot at the lower end. Rotation of the jack-screw extends the foot to the ground. Thereby weight may be transferred from the draw-bar at its point of attachment to the tractor vehicle to the jack. In this showing, the draw-bar has an upwardly rising portion 30 at the forward end of member 22. A forward extending beam of bar 32 passes over the rear wall 16 of the load receiving box 12 to a position substantially over the transverse axis of the drive wheels 18. A column 34 depends from bar 32 and by means of a swivel connection 36 supported by structure 37 is coupled to the trailer hitch apparatus (more fully described hereafter) which is mounted in the load-receiving box 12.

Figure 2:
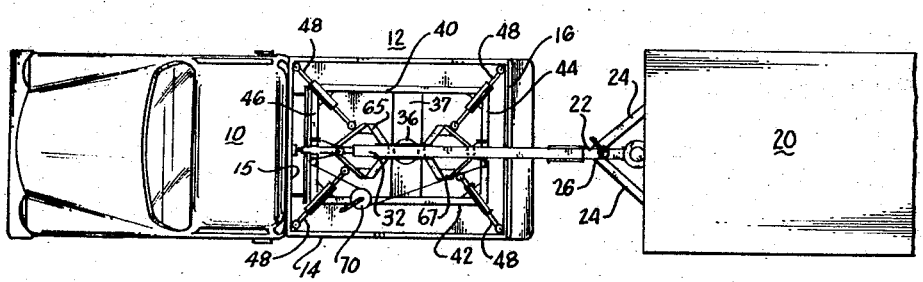
FIGURE 2 is a plan view of the assembly of FIGURE 1.
Figure 10:
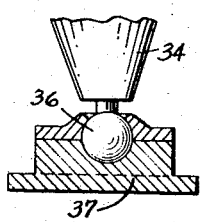
FIGURE 10 illustrates the swivel connection between the trailer hitch apparatus and a tow-bar.

Referring to FIGURE 2, the trailer hitch apparatus comprises a rectangular frame having side members 40, 42, rear cross member 44 and front cross member 46. This frame is preferably somewhat smaller than the load-receiving box so that it may easily be lowered or slid into the box. At each corner of the frame, as is more clearly shown in FIGURES 5, 6 and 7, there is an anchor bar 48 which is slidably mounted in a guide channel provided between walls 49. The channels overlie anchor plates 51 which are secured at the corners of the frame in such manner that the anchor bar 48 generally bisects the angle of the corner, for example, at the juncture of members 40 and 44. Plate 51 is secured in adjusted position by nuts 57 on bolts 59. As best may be seen in FIGURE 7, a gusset plate 53 is integrated into the structure and provided with slotted openings 55 through which the bolts 59 pass. By means of this pin and slot arrangement the angular disposition of the bar 48 in its bisecting relation to the corner of the frame may be adjusted or changed to accommodate the trailer hitch apparatus to load-receiving boxes 12 of varying size configurations.

The ends of the anchor bars 48 are bifurcated or forked as at 50 on the outer end and, at 52 on the inner end. A roller 54 is carried in the outer fork 50 and roller 56 is likewise carried in a similar manner in fork 52 on the inner end of bar 48. Spring 58 functions to bias and draw bar 48 inward relative the frame.

Figure 6:
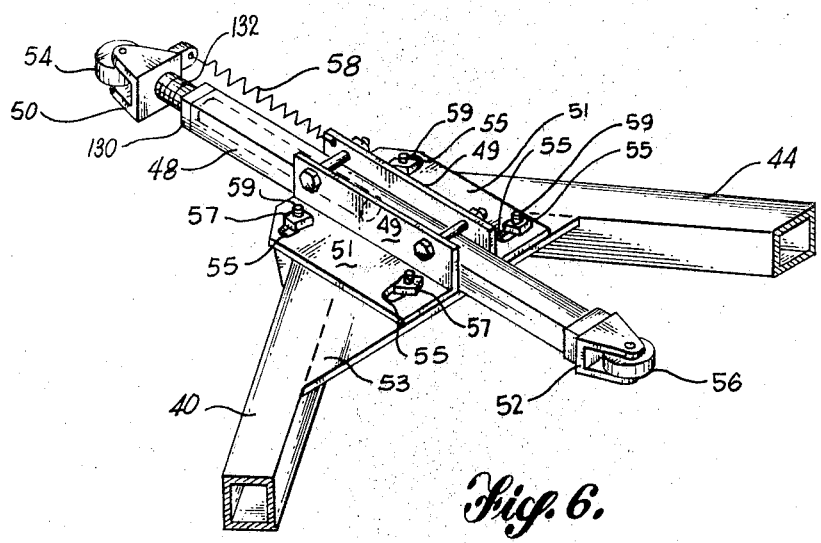
FIGURE 6 is a perspective view of the expandable-contractable means employed to anchor the hitch apparatus in a load-receiving box.
Figure 7:
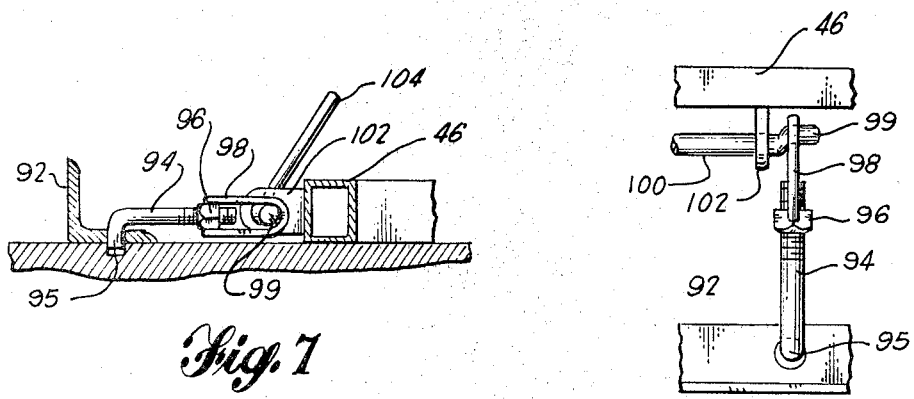
FIGURE 7 is a side view partially in section of the anchoring means of FIGURE 4.

The frame comprising members 40, 42, 44, and 46 includes cross members 41 and 43 as shown in FIGURES 5 and 6. Guides 60, 61, 62, and 63, located in aligned relationship at the approximate longitudinal axis of a frame and secured on their respective cross bars 46, 41, 43, 44, receive the two slide bars 64 and 66, each of which moves longitudinally outward or inward relative the frame median. Secured to the guide bars 64 and 66, are diamond shaped wedge frames 65 and 67 respectively. Each of the wedge frames is movable with its respective bar toward and away from the adjacent end of the main rectangular frame of the trailer hitch apparatus. That end of each of the wedge frames 65 or 67 that is nearest an end of the rectangular frame is provided with a pair of cam surfaces 68 and 69. The innermost roller 56 of each of the slidable anchor bars 48 bears on and is influenced by one of the cam surfaces. Contact is maintained by the inward bias supplied to the anchor bar 48 by spring means 58.

Anchor bars 48 are desirably variable as to length to accommodate different sizes of load-carrying truck bodies. As shown in FIGURE 6, bar 48 is hollow and has a nut 130 on its end. Screw bar 132 on fork 50 engages in and passes through the nut 130 into the interior of bar 50. Rotation of fork 50 and screw 132, after the spring 58 has been disconnected, results in adjustment of the length of the bar 48.

A doubled drum winch 70, operated by crank 72 has cables 74 and 76 anchored on their inner ends to the drums. Cable 74 is led around an idler sheave 75, thence around sheave 77 on the frame 65 and finally to an anchor eye-bolt 79 as shown in FIGURE 4. Similarly cable 76 passes around the guide-sheave 80, sheave 82 on frame 67, and thence to an anchor eye-bolt 84 carried by the rectangular frame member 44 as shown to the right in FIGURE 5. Springs 86, between wedge frames 65 and 67 tend to draw the frames toward each other or toward the central position of the frame.

It will be apparent from the structure described that rotation of the winch 70 imparts a draft on cables 74 and 76 and draws the wedge members 65 and 67 toward the outer end members of the rectangular frame.

In FIGURE 4 the wedge frame 65 has been moved to the left whereas in FIGURE 5, the wedge frame 67 is shown in the retracted or centralized position. With frame 65 projected, as in FIGURE 4, the anchor-bars 48 are likewise extended outward and forward into the corners of the load receiving box where they bear upon the front and respective side walls formed therein. Likewise, rearward movement of the frame 67 will produce a similar extension of the rear anchor bars 48 into engagement with the rear corners of the load-receiving box.

A footed-screw 90, on slide bar 64 is provided to bear against the front wall of the vehicle to prevent the trailer hitch apparatus, upon the occasion of a sudden lurch, from jumping forwardly and applying all the strain to the angularly disposed anchor bars 48.

Figure 8:
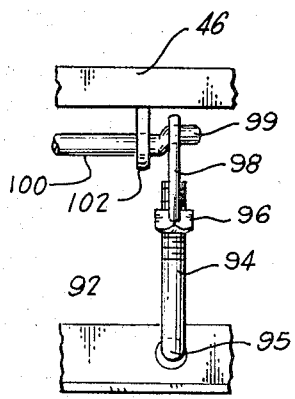
FIGURE 8 is a plan view of anchoring means employed to latch the hitch apparatus in a load receiving box of a tractor vehicle.
Figure 9:
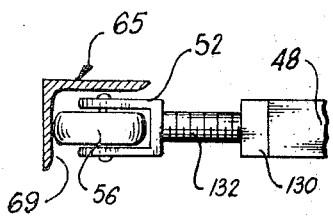
FIGURE 9 is a detailed sectional view taken on line 9—9 of FIGURE 4.

It is customary that in the front of the load-receiving box and extending there across, there be an angle bar 92 to bolster the front wall 15 of the box to receive part of the forward thrust of the trailer hitch apparatus during periods of deceleration. Bar 92 is also engaged by draft links 94 mounted at the front of the rectangular frame. Draft links 94, as in FIGURES 4, 7 and 8, have a hook 95 on their front ends and are threaded in nuts 96 for lengthwise adjustment. A bail 98 passes around an eccentric crank 99 of the cross-shaft 100 journalled in ears 102 on the rectangular frame. Lever 104 on shaft 100 permits manual rotation of said shaft and rotation of the eccentric cranks 99 to either tighten or loosen the draft links 94. It is desirable when the triangular frame of the hitch apparatus is centralized in the load-receiving box of the tractor vehicle, that the draft links, through their crank actuators, be tightened not only to draw the forward anchor bars 48 and rollers 54 into tight engagement with the load-receiving box but also to anchor the rectangular frame against the pull of the trailer vehicle.

Figure 3:
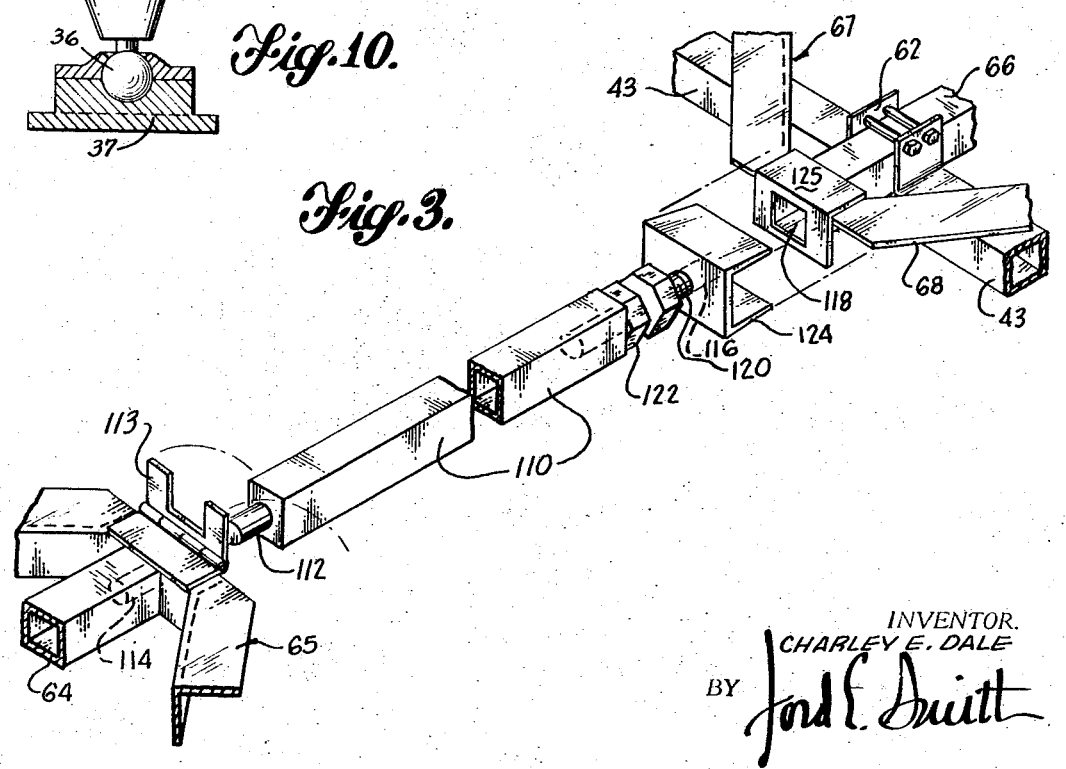
FIGURE 3 is an enlarged fragmentary perspective view of a locking means employed in the trailer hitch apparatus.

The opposed ends of the frames 65 and 67, in the spread apart condition existing when the hitch apparatus is mounted in a load-receiving box, are spaced apart a distance of approximately 16–18 inches. In order to insure maintenance of this spacing, in other words to anchor them in their spaced apart relation, the spanner bar 110 shown in FIGURE 3 is employed. Bar 110 has pin 112 on its forward end which fits into socket 114 of wedge frame 65. Likewise pin 116 on the rear end of bar 110 fits into a socket 118 on frame 67. Pin 116 is an extended part of screw 120 which is threadedly engaged into an anchored nut 122 on the rear end of bar 110. Channel member 124 is also secured on bolt 120. Adjustment of screw 120 effectively lengthens or decreases the length of bar 110 to accommodate various spacings of frames 65 and 67. Channel 124, with pin 116 engaged in socket 118, straddles the head 125 of frame 67. Rotation of bar 110, which is preferably square in cross-section, is prevented by notched and pivoted locking member 113 when swung, as indicated in FIGURE 3, into straddling relationship with bar 110. This eliminates unintentional rotation of the bar and any consequential tendency for the same to change in length.

The swivel at 36 between column 34 and structure 37 on the trailer hitch apparatus, may be of any conventional ball and socket nature. Naturally it is desirable that this connection provide a wide latitude of swing, preferably as much as 90° similar to that available with a conventional "fifth-wheel" trailer hitches. The swivel also should be a connection which permits the user, by means of his jack 26, to lift the bar 32, the column 34 and the entire rectangular frame and its appurtenances off the deck or floor of the load-receiving box of the tractor vehicle. With this capability, it will be seen that an operator may locate his trailer at a desired position, retract the extended anchor bars 48, disconnect the draft links 94 and then, by lowering the foot of jack 26, transfer the load of the hitch apparatus and the tow-bar from the tractor vehicle to the jack. By lowering the conventional tail-gate of the load-receiving box, he may then simply drive his tractor vehicle away and use it in the usual manner. If necessary the trailer 20 may be relowered to level the trailer floor.

Having thus described the invention, what is claimed is:

1. A trailer hitch apparatus for receiving and coupling a trailer tow bar with a tractor vehicle having a load receiving box, comprising:

a rectangular frame smaller than the floor of the receiving box;
   an anchor bar slidably mounted in bisecting relation at each corner of the frame and extending inward thereof toward the longitudinal axis, of said frame;
   wedge members movable in said frame, said wedge members each having a cam surface in contact with inner end of one of said anchor bars;
   means operable to move said wedge members to outwardly project each of said anchor bars into engagement with the walls of said receiving box; and
   coupler means carried by said frame to receive and engage a trailer tow bar.

2. The structure according to claim 1 in which the wedge members at each end of the frame are integrally paired and the pairs move oppositely in the longitudinal axis of the frame.

3. The structure according to claim 1 including means inwardly biasing each said anchor bar.

4. The structure according to claim 1 in which the means operable to move said wedge members includes draw cables to pull said wedge members toward the ends of the frame and means is included to import draft to said cables.

5. The structure according to claim 1 in which means is included to bias said wedge members toward the median of said frame.

6. The structure according to claim 1 in which means is included to secure said anchor bars in their projected positions in said receiving box.

7. The structure according to claim 1 in which means is included to lock said frame, when said anchor bars are projected, against fore and aft movement relative the receiving box.

References Cited
UNITED STATES PATENTS

| | | | |
|---|---|---|---|
| 2,425,521 | 8/1947 | Ellberg | 280—438 |
| 3,164,398 | 1/1965 | Lugash | 280—423 |
| 3,164,399 | 1/1965 | Lugash | 280—423 |
| 3,220,750 | 11/1965 | Mead | 280—423 |

LEO FRIAGLIA, *Primary Examiner.*